US012700670B2

(12) United States Patent
Sudo et al.

(10) Patent No.: US 12,700,670 B2
(45) Date of Patent: Aug. 4, 2026

(54) ANTENNA MODULE AND COMMUNICATION APPARATUS INCLUDING THE SAME

(71) Applicant: Murata Manufacturing Co., Ltd., Nagaokakyo (JP)

(72) Inventors: Kaoru Sudo, Nagaokakyo (JP); Jumpei Takabayashi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 47 days.

(21) Appl. No.: 19/003,607

(22) Filed: Dec. 27, 2024

(65) Prior Publication Data

US 2025/0149788 A1 May 8, 2025

Related U.S. Application Data

(63) Continuation of application No. PCT/JP2023/009603, filed on Mar. 13, 2023.

(30) Foreign Application Priority Data

Jun. 29, 2022 (JP) ................................ 2022-104420

(51) Int. Cl.
*H01Q 5/20* (2015.01)
*H01Q 1/27* (2006.01)
(Continued)

(52) U.S. Cl.
CPC ................ *H01Q 5/20* (2015.01); *H01Q 1/27* (2013.01); *H01Q 1/48* (2013.01); *H01Q 5/10* (2015.01); *H01Q 9/0407* (2013.01)

(58) Field of Classification Search
CPC ...... H01Q 1/38; H01Q 21/065; H01Q 1/2283; H01Q 1/243; H01Q 9/0407; H01Q 9/0414;
(Continued)

(56) References Cited

FOREIGN PATENT DOCUMENTS

| | | | |
|---|---|---|---|
| WO | 2019/188413 | A1 | 10/2019 |
| WO | 2019/188471 | A1 | 10/2019 |

(Continued)

OTHER PUBLICATIONS

International Search Report and Written Opinion mailed on May 23, 2023, received for PCT Application PCT/JP2023/009603, filed on Mar. 13, 2023, 10 pages including English Translation.

*Primary Examiner* — Monica C King
(74) *Attorney, Agent, or Firm* — XSENSUS LLP

(57) ABSTRACT

An antenna module includes a ground electrode disposed in a dielectric substrate (and radiating elements and feed wiring lines. The radiating elements are disposed to face the ground electrode. The feed wiring lines transmit radio frequency signals to the radiating elements. The radiating element is disposed between the radiating element and the ground electrode. The radiating element is disposed between the radiating element and the ground electrode. The radiating element is larger in size than the radiating element, and the radiating element is larger in size than the radiating element. In plan view in a direction normal to the dielectric substrate, the radiating elements are disposed to overlap with each other. The feed wiring line transmits a radio frequency signal to the radiating element. The feed wiring line transmits a radio frequency signal to the radiating elements.

20 Claims, 11 Drawing Sheets

(51) Int. Cl.

| | |
|---|---|
| ***H01Q 1/48*** | (2006.01) |
| ***H01Q 5/10*** | (2015.01) |
| ***H01Q 9/04*** | (2006.01) |

(58) Field of Classification Search

CPC H01Q 1/48; H01Q 7/00; H01Q 21/08; H01Q 1/2225; H01Q 23/00; H01Q 9/045; H01Q 21/24; H01Q 1/40; H01Q 13/08; H01Q 21/28; H01Q 1/2208; H01Q 9/0421; H01Q 1/36; H01Q 3/26; H01Q 1/523; H01Q 13/10; H01Q 21/0025; H01Q 5/378; H01Q 5/40; H01Q 9/0435; H01Q 9/285; H01Q 21/06; H01Q 1/52; H01Q 1/526; H01Q 5/35; H01Q 7/06; H01Q 9/30; H01Q 5/335; H01Q 9/16; H01Q 3/28; H01Q 5/307; H01Q 1/241; H01Q 1/422; H01Q 3/36; H01Q 1/2216; H01Q 1/2266; H01Q 1/521; H01Q 19/005; H01Q 21/0075; H01Q 21/062; H01Q 25/00; H01Q 5/371; H01Q 1/42; H01Q 1/44; H01Q 1/50; H01Q 21/0006; H01Q 21/205; H01Q 21/30; H01Q 5/357; H01Q 9/0428; H01Q 9/0457; H01Q 5/385; H01Q 5/50; H01Q 9/28; H01Q 9/42; H01Q 1/085; H01Q 1/24; H01Q 19/06; H01Q 25/001; H01Q 5/10; H01Q 1/2291; H01Q 15/08; H01Q 15/24; H01Q 19/062; H01Q 21/0087; H01Q 21/061; H01Q 21/245; H01Q 3/24; H01Q 3/30; H01Q 5/328; H01Q 9/0442; H01Q 9/0478; H01Q 9/06; H01Q 19/185; H01Q 25/005; H01Q 5/28; H01Q 5/321; H01Q 9/0485; H01Q 9/065; H01Q 1/06; H01Q 1/12; H01Q 1/14; H01Q 1/22; H01Q 1/248; H01Q 1/273; H01Q 1/405; H01Q 1/421; H01Q 1/46; H01Q 1/525; H01Q 11/14; H01Q 11/20; H01Q 13/106; H01Q 15/10; H01Q 15/242; H01Q 19/02; H01Q 19/021; H01Q 19/106; H01Q 21/0093; H01Q 21/10; H01Q 21/20; H01Q 25/007; H01Q 3/2611; H01Q 3/2658; H01Q 3/42; H01Q 3/44; H01Q 5/25; H01Q 7/005; H01Q 7/08; H01Q 9/24; H01Q 9/26; H01Q 1/27; H01Q 15/0086; H01Q 21/12; H01Q 5/20; H01Q 5/342; H01Q 5/45; H01Q 5/48; H01Q 9/0471; H01Q 9/27

See application file for complete search history.

(56) References Cited

FOREIGN PATENT DOCUMENTS

| | | | |
|---|---|---|---|
| WO | 2020/031776 | A1 | 2/2020 |
| WO | 2020/149138 | A1 | 7/2020 |
| WO | 2020/217971 | A1 | 10/2020 |
| WO | 2020/261806 | A1 | 12/2020 |
| WO | 2022/185874 | A1 | 9/2022 |

10

ANTENNA MODULE AND COMMUNICATION APPARATUS INCLUDING THE SAME

CROSS-REFERENCE TO RELATED APPLICATIONS

The present application is a continuation application of PCT Patent application PCT/JP2023/009603, filed Mar. 13, 2023, which claims the benefit of the earlier filing date of Japanese Patent Application No. JP 2022-104420, filed Jun. 29, 2022, the entire contents of each of which is incorporated herein by reference.

TECHNICAL FIELD

The present disclosure relates to an antenna module and a communication apparatus including the same, and more specifically, relates to a configuration of an antenna module capable of radiating radio waves in three different frequency bands.

BACKGROUND ART

International Publication No. WO2019/188413, specification (Patent Document 1) and International Publication No. WO2019/188471, specification (Patent Document 2) disclose antenna modules of a stacked type each having plate-shaped radiating elements capable of radiating radio waves in two different frequency bands.

CITATION LIST

Patent Document

Patent Document 1: International Publication No. WO2019/188413, specification
Patent Document 2: International Publication No. WO2019/188471, specification

SUMMARY

Technical Problem

Each antenna module disclosed in a corresponding one of Patent Document 1 and Patent Document 2 is used for a mobile terminal such as a mobile phone, a smartphone, or a tablet. In the mobile terminal as described above, radio waves in millimeter wave bands of, for example, 28 and 39 GHz are used on occasions.

In recent years, there is a trend of adding a new frequency band (such as a 48 GHz band or a 60 GHz band) to improve radio communication traffic and communication quality with the increase of the number of communication apparatuses, and this involves a need to transmit and receive a radio wave in the new frequency band in addition to radio waves in frequency bands used to date.

In contrast, in the case where the radio waves in three different frequency bands are transmitted and received, separately supplying radio frequency signals to radiating elements for the respective frequency bands leads to an increase of the number of output ports of a feeder circuit, thus causing an increase in the area of paths in the feeder circuit and an increase in the number of feed wiring lines for transmitting radio frequency signals from the feeder circuit to the radiating elements. This causes an antenna module size to be increased and possibly causes the overall downsizing of the communication apparatus to be prevented.

The present disclosure has been made to address the issue as described above, as well as other issues, and aims to prevent apparatus size increase regarding an antenna module capable of radiating radio waves in three different frequency bands.

Solutions to Problems

An antenna module according to an aspect of the present disclosure includes: a dielectric substrate; a ground electrode disposed in the dielectric substrate; a first radiating element to a third radiating element that are of a plate shape; and a first feed wiring line and a second feed wiring line. Each radiating element is disposed in or on the dielectric substrate to face the ground electrode. The feed wiring lines transmit radio frequency signals to the radiating elements. The second radiating element is disposed between the third radiating element and the ground electrode. The first radiating element is disposed between the second radiating element and the ground electrode. The second radiating element is larger in size than the third radiating element, and the first radiating element is larger in size than the second radiating element. In plan view in a direction normal to the dielectric substrate, the radiating elements are disposed to overlap with each other. The first feed wiring line transmits one of the radio frequency signals to one of the first radiating element, the second radiating element, and the third radiating element. The second feed wiring line transmits a radio frequency signal to two remaining ones of the radiating elements.

An antenna module according to another aspect of the present disclosure includes a dielectric substrate; a ground electrode disposed in the dielectric substrate; a first radiating element to a third radiating element that are of a plate shape; and a first feed wiring line and a second feed wiring line. Each radiating element is disposed in or on the dielectric substrate to face the ground electrode. The feed wiring lines transmit radio frequency signals to the radiating elements. The second radiating element is disposed between the third radiating element and the ground electrode. The first radiating element is disposed between the second radiating element and the ground electrode. The first radiating element is capable of radiating one of the radio waves in a first frequency band. The second radiating element is capable of radiating one of the radio waves in a second frequency band higher than the first frequency band. The third radiating element is capable of radiating one of the radio waves in a third frequency band higher than the second frequency band. In plan view in a direction normal to the dielectric substrate, the radiating elements are disposed to overlap with each other. The first feed wiring line transmits one of the radio frequency signals to one of the first radiating element, the second radiating element, and the third radiating element. The second feed wiring line transmits the radio frequency signal to two remaining ones of the radiating elements.

Advantageous Effects of Invention

The antenna module according to the present disclosure is configured to supply the radio frequency signals to the three radiating elements for the three respective different frequency bands by using the two feed wiring lines. The radio frequency signals may thus be supplied to the three radiating elements by utilizing a feeder circuit used to date that separately supplies radio frequency signals to radiating elements for two different frequency bands. Accordingly, regarding an antenna module capable of radiating radio wave in three different frequency bands, apparatus size increase may be prevented.

DESCRIPTION OF EMBODIMENTS

Figure 1:
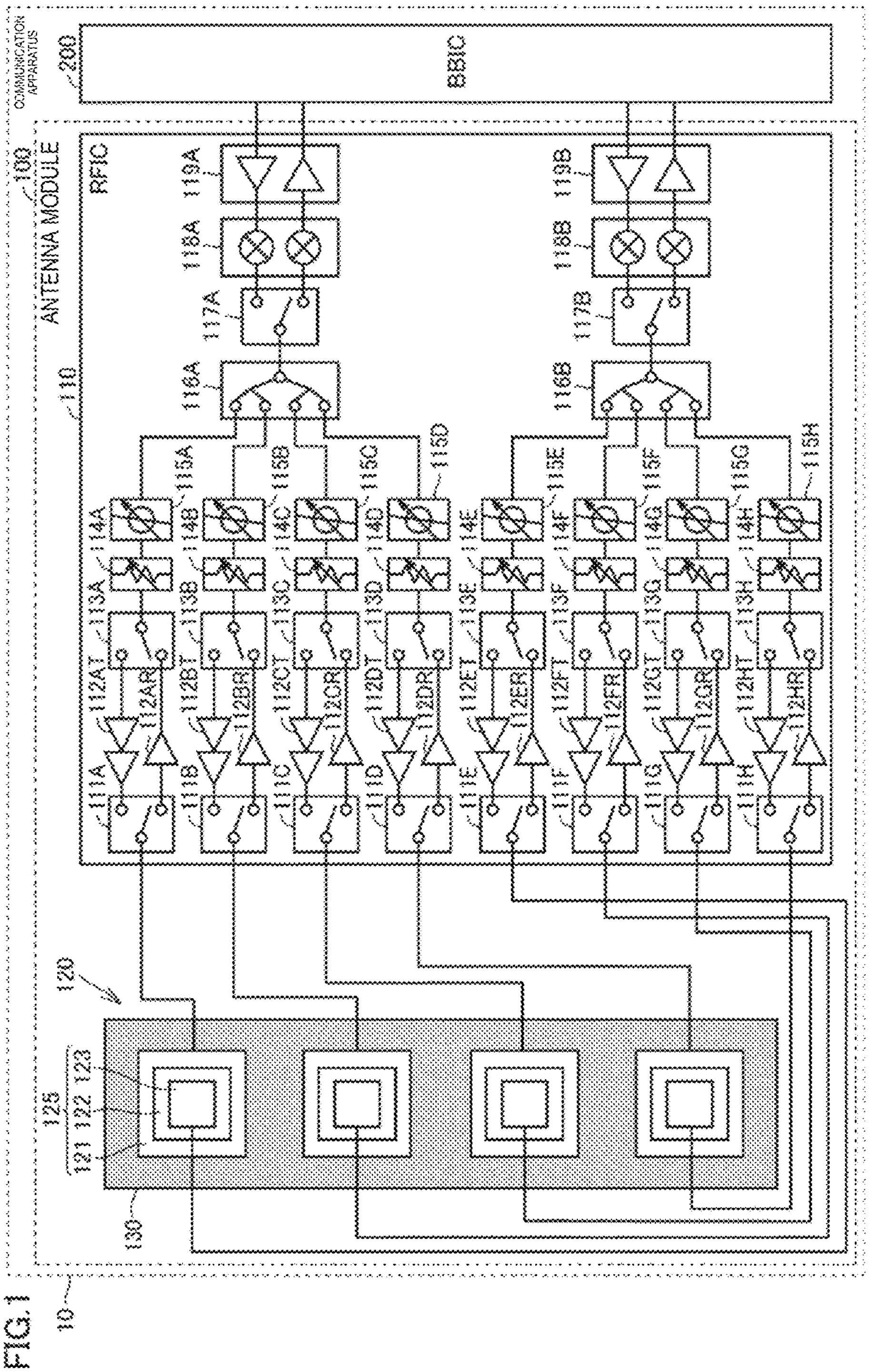
FIG. 1 is a block diagram of a communication apparatus to which an antenna module according to Embodiment 1 is applied.

Hereinafter, embodiments of the present disclosure will be described in detail with reference to the drawings. The same or corresponding portions in the drawings are denoted by the same reference numerals, and description thereof is not repeated.

Embodiment 1

(Basic Configuration of Communication Apparatus)

FIG. 1 is a block diagram of a communication apparatus 10 to which an antenna module 100 according to Embodiment 1 is applied. The communication apparatus 10 is, for example, a mobile terminal such as a mobile phone, a smartphone, or a tablet or a personal computer. A radio wave used for the antenna module 100 according to Embodiment 1 is, for example, a radio wave in a frequency band of a millimeter wave band with the center frequency of 28, 39, or 48 GHz. However, the radio wave is applicable to a radio wave in a frequency band other than the above.

With reference to FIG. 1, the communication apparatus 10 includes the antenna module 100 and a BBIC 200 configured as a baseband signal processing circuit. The antenna module 100 includes a radio frequency integrated circuit (RFIC) 110 as an example of a feeder circuit and an antenna device 120. The communication apparatus 10 radiates, from the antenna device 120, a radio frequency signal upconverted from a signal transmitted from the BBIC 200 to the antenna module 100 and also processes, at the BBIC 200, a signal down-converted from a radio frequency signal received by the antenna device 120.

The antenna device 120 includes a dielectric substrate 130 and a plurality of antenna elements 125 in or on the dielectric substrate 130. FIG. 1 illustrates an example array structure in which the four antenna elements 125 are arranged in line in or on the dielectric substrate 130; however, the number of antenna elements 125 is not limited to this. A single antenna element 125 may be disposed in or on the dielectric substrate 130, or a configuration where a plurality of antenna elements 125 the number of which is other than 4 may be used. An array structure in which the antenna elements 125 are two-dimensionally arranged may also be used.

Each antenna element 125 includes plate-shaped radiating elements 121, 122, and 123 of respective different sizes. The radiating elements 121, 122, and 123 are each a plate-shaped circular, oval, or polygon patch antenna. In Embodiment 1, a case where each radiating element is a micro strip antenna of substantially a square shape is described as an example. As to be described later with reference to FIGS. 2 and 3, in or on the dielectric substrate 130, the radiating elements 121, 122, and 123 are disposed spaced away from each other in a direction normal to the dielectric substrate 130.

The radiating element 121 is larger in size than the radiating elements 122 and 123, and the radiating element 122 is larger in size than the radiating element 123.

Accordingly, the frequency band of a radio wave radiated from the radiating element 122 is higher than the frequency band of a radio wave radiated from the radiating element 121, and the frequency band of a radio wave radiated from the radiating element 123 is higher than the frequency bands of the radio waves radiated from the radiating elements 121 and 122. In the example in Embodiment 1, the frequency band of the radio wave radiated from the radiating element 121 (a first frequency band) is a 28 GHz band (from 24.25 to 29.5 GHz), the frequency band of the radio wave radiated from the radiating element 122 (a second frequency band) is a 39 GHz band (from 37.0 to 43.5 GHz), and the frequency band of the radio wave radiated from the radiating element 123 (a third frequency band) is a 48 GHz band (from 47.2 to 48.2 GHz).

The RFIC 110 includes switches 111A to 111H, 113A to 113H, 117A, and 117B, power amplifiers 112AT to 112HT, low-noise amplifiers 112AR to 112HR, attenuators 114A to 114H, phase shifters 115A to 115H, signal multiplexer/demultiplexers 116A and 116B, mixers 118A and 118B, and amplifier circuits 119A and 119B. Of these, the switches 111A to 111D, 113A to 113D, and 117A, the power amplifiers 112AT to 112DT, the low-noise amplifiers 112AR to 112DR, the attenuators 114A to 114D, the phase shifters 115A to 115D, the signal multiplexer/demultiplexer 116A, the mixer 118A, and the amplifier circuit 119A are configured as a circuit for a radio frequency signal radiated from the radiating element 121. The switches 111E to 111H, 113E to 113H, and 117B, the power amplifiers 112ET to 112HT, the low-noise amplifiers 112ER to 112HR, the attenuators 114E to 114H, the phase shifters 115E to 115H, the signal multiplexer/demultiplexer 116B, the mixer 118B, and the amplifier circuit 119B are configured as a circuit for radio frequency signals radiated from the radiating element 122 and the radiating element 123.

In a case where a radio frequency signal is transmitted, the switches 111A to 111H and 113A to 113H are switched over to the power amplifiers 112AT to 112HT, and the switches 117A and 117B are connected to amplifiers on the transmission side in the amplifier circuits 119A and 119B. In a case where the radio frequency signal is received, the switches 111A to 111H and 113A to 113H are switched over to the low-noise amplifiers 112AR to 112HR, and the switches 117A and 117B are connected to amplifiers on the reception side in the amplifier circuits 119A and 119B.

Signals transmitted from the BBIC 200 are amplified by the amplifier circuits 119A and 119B and upconverted by the mixers 118A and 118B. The transmission signals that are upconverted radio frequency signals are demultiplexed into four signals by the signal multiplexer/demultiplexers 116A and 116B and supplied to the respective radiating elements via respective signal paths. The phase shift degrees of the respective phase shifters 115A to 115H disposed on the signal paths are adjusted individually, and the directivity of radio waves output from each radiating elements of the substrate may thereby be adjusted. The attenuators 114A to 114H adjusts the strength of the transmission signals.

Reception signals that are radio frequency signals received by the respective radiating elements are transmitted to the RFIC 110 and multiplexed by the signal multiplexer/demultiplexers 116A and 116B via four mutually different signal paths. The multiplexed reception signals are down-converted by the mixers 118A and 118B, amplified by the amplifier circuits 119A and 119B, and transmitted to the BBIC 200.

The RFIC 110 is formed, for example, as an integrated circuit component as one chip having the above-described circuit configuration. Alternatively, devices (a switch, a power amplifier, a low-noise amplifier, an attenuator, and a phase shifter) for each of the radiating elements in the RFIC 110 may be formed as an integrated circuit component as one chip for the corresponding radiating element.

(Antenna Module Structure)

Figure 2:
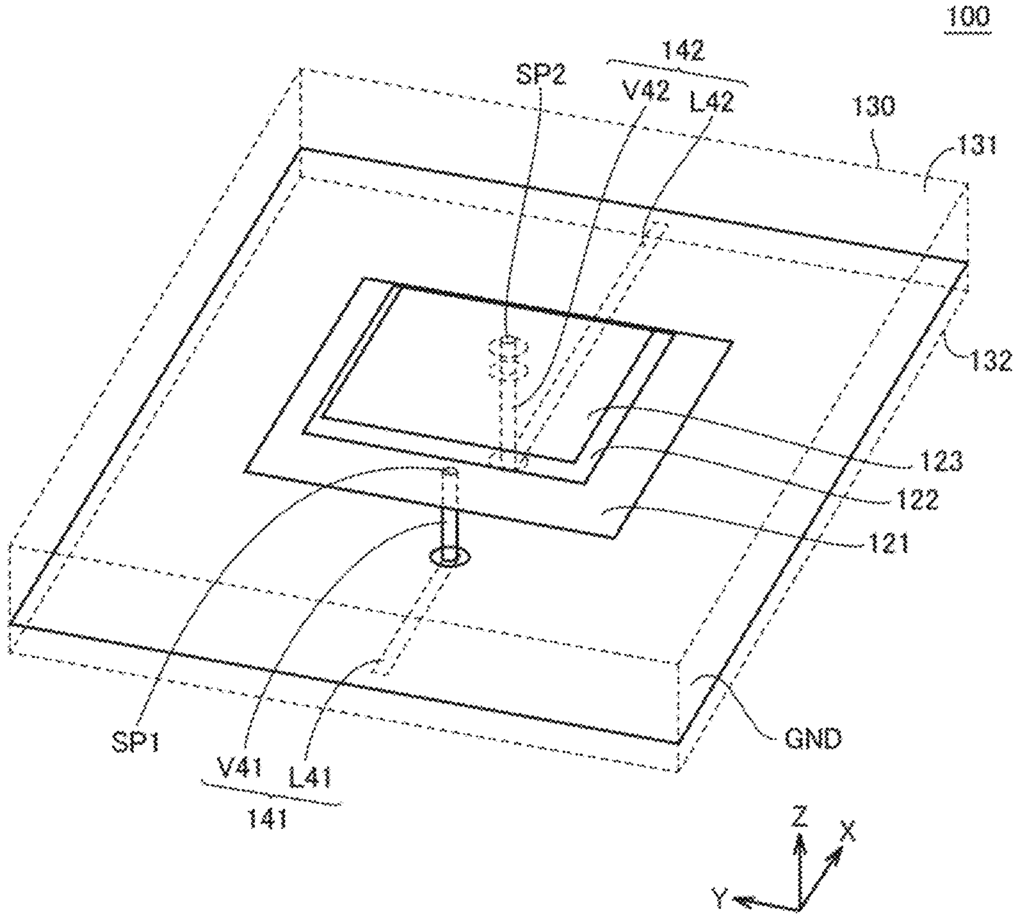
FIG. 2 is a perspective view of the antenna module according to Embodiment 1.
Figure 3:
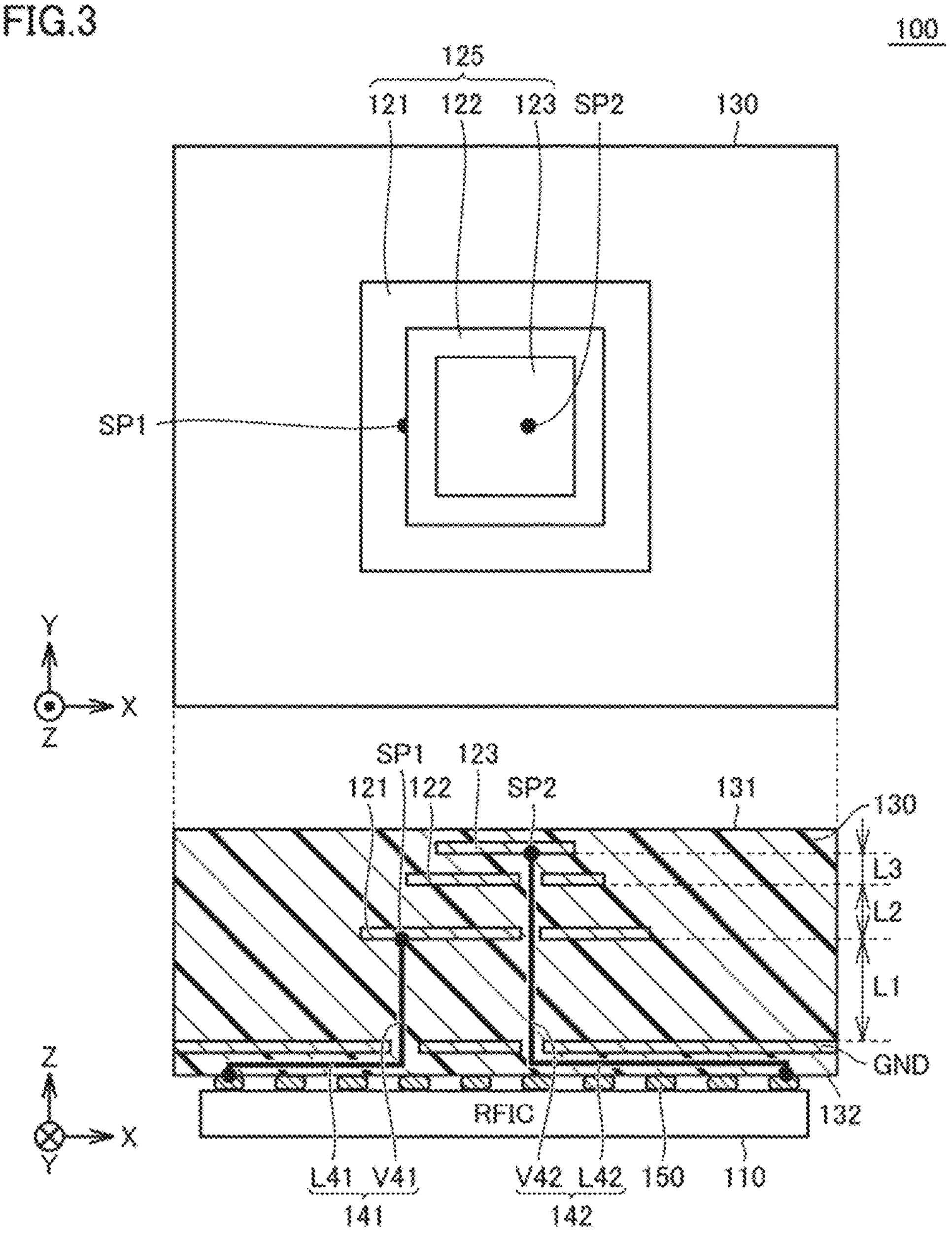
FIG. 3 illustrates a plan view and a side perspective view of the antenna module in FIG. 2.

Details of the configuration of the antenna module 100 in Embodiment 1 will then be described by using FIGS. 2 and 3. FIG. 2 is a perspective view of the antenna module 100. FIG. 3 illustrates a plan view (upper part) and a side perspective view (lower part) of the antenna module 100.

With reference to FIGS. 2 and 3, the antenna module 100 includes a ground electrode GND and feed wiring lines 141 and 142 in addition to the antenna elements 125 (the radiating elements 121, 122, and 123) and the RFIC 110. With reference to FIGS. 2 and 3, the configuration in which the single antenna element 125 is disposed in the dielectric substrate 130 will be described as an example. In the following description, the direction normal to the dielectric substrate 130 is a Z-axis direction, and a plane orthogonal to the normal direction is an XY plane. A positive direction and a negative direction of the Z axis in the drawings are respectively referred to as an upper side and a lower side on occasions.

The substrate 130A is, for example, a low-temperature co-fired ceramic (LTCC: Low Temperature Co-fired Ceramics) multi-layer substrate, a multi-layer resin substrate formed by laminating a plurality of resin layers formed from resin such as epoxy or polyimide, a multi-layer resin substrate formed by laminating a plurality of resin layers formed from liquid crystal polymer (Liquid Crystal Polymer: LCP) having a lower dielectric constant, a multi-layer resin substrate formed by laminating a plurality of resin layers formed from fluorine-based resin, a multi-layer resin substrate formed by laminating a plurality of resin layers formed from a Polyethylene terephthalate (PET) material, or a ceramic multi-layer substrate other than the LTCC. The dielectric substrate 130 does not necessarily have to have the multi-layer structure and may be a single-layer substrate.

In plan view in the normal direction (Z-axis direction), the dielectric substrate 130 has a substantially rectangular shape. In FIGS. 2 and 3, a direction along one of two adjacent sides is an X-axis direction, and a direction along the other side is a Y-axis direction.

The radiating element 123 is disposed near an upper surface 131 of the dielectric substrate 130. The radiating element 123 may be disposed in such a manner as to be exposed to the surface of the dielectric substrate 130 or may be disposed in a layer inside the dielectric substrate 130 as in the example in the lower part of FIG. 3. The ground electrode GND is disposed near a lower surface 132 of the dielectric substrate 130 to extend over the dielectric substrate 130. In addition, the RFIC 110 is mounted on the lower surface 132 of the dielectric substrate 130 by using solder bumps 150. The RFIC 110 may be mounted on the dielectric substrate 130 by using a connector.

In the dielectric substrate 130, the radiating element 122 is disposed between the radiating element 123 and the ground electrode GND. In addition, the radiating element 121 is disposed between the radiating element 122 and the ground electrode GND. In other words, the radiating element 121, the radiating element 122, and the radiating element 123 are disposed in this order from the ground electrode GND toward the upper surface 131.

In the direction normal to the dielectric substrate 130 (Z-axis direction), an inter-element distance L1 (first distance) between the radiating element 121 and the ground electrode GND is longer than an inter-element distance L2 (second distance) between the radiating element 121 and the radiating element 122. The inter-element distance L2 between the radiating element 121 and the radiating element 122 is longer than an inter-element distance L3 between the radiating element 122 and the radiating element 123. That is, a relationship of L1>L2>L3 holds true. The inter-element distances L1, L2, and L3 are set for the band width of the target frequency. A longer inter-element distance is set for a wider band width.

As illustrated in the upper part of FIG. 3, in plan view of the dielectric substrate 130 in the normal direction, the radiating elements 121, 122, and 123 are disposed to overlap with each other.

The radiating element 121 receives a radio frequency signal supplied from the RFIC 110 via the feed wiring line 141. The feed wiring line 141 includes a belt-shaped plate electrode L41 extending on the XY plane in the dielectric substrate 130 and a via V41 extending in the Z-axis direction. From the RFIC 110 to a portion below the radiating element 121, the feed wiring line 141 extends as the plate electrode L41 in the positive direction of the X axis in the dielectric layer that is closer to the lower surface 132 than the ground electrode GND is. The feed wiring line 141 penetrates therefrom as the via V41 through the ground electrode GND and is connected to a feed point SP1 of the radiating element 121. The feed point SP1 is shifted in the negative direction of the X axis with respect to the element center of the radiating element 121. The radio frequency signal is supplied to the feed point SP1, and thereby a radio wave a polarization direction of which is the X-axis direction is radiated from the radiating element 121 in the Z-axis direction.

The feed wiring line 142 includes a plate electrode L42 and a via V42. From the RFIC 110 to a portion below the radiating element 123, the feed wiring line 142 extends as the plate electrode L42 in the negative direction of the X axis in the dielectric layer that is closer to the lower surface 132 than the ground electrode GND is. The feed wiring line 142 penetrates therefrom as the via V42 through the ground electrode GND and the radiating elements 121 and 122 and is connected to a feed point SP2 of the radiating element 123. The feed point SP2 is shifted in the positive direction of the X axis with respect to the element center of the radiating element 123. The radio frequency signal for the radiating element 123 is supplied to the feed point SP2, and thereby a radio wave the polarization direction of which is the X-axis direction is radiated from the radiating element 123 in the Z-axis direction.

In response to the radio frequency signal for the radiating element 122 being supplied to the feed wiring line 142, the feed wiring line 142 and the radiating element 122 are coupled together in a portion corresponding to the through hole of the radiating element 122. The through hole of the radiating element 122 is shifted in the positive direction of the X axis with respect to the element center of the radiating element 123. Accordingly, in response to the radio frequency signal for the radiating element 122 being supplied, a radio wave the polarization direction of which is the X-axis direction is radiated from the radiating element 122. That is, in the antenna module 100, the feed wiring line 142 is shared by the radiating element 122 and the radiating element 123, and switching of a radio frequency signal to be supplied the feed wiring line 142 causes a radio wave to be radiated from one of the radiating element 122 and the radiating element 123.

(Antenna Characteristics)

Figure 4:
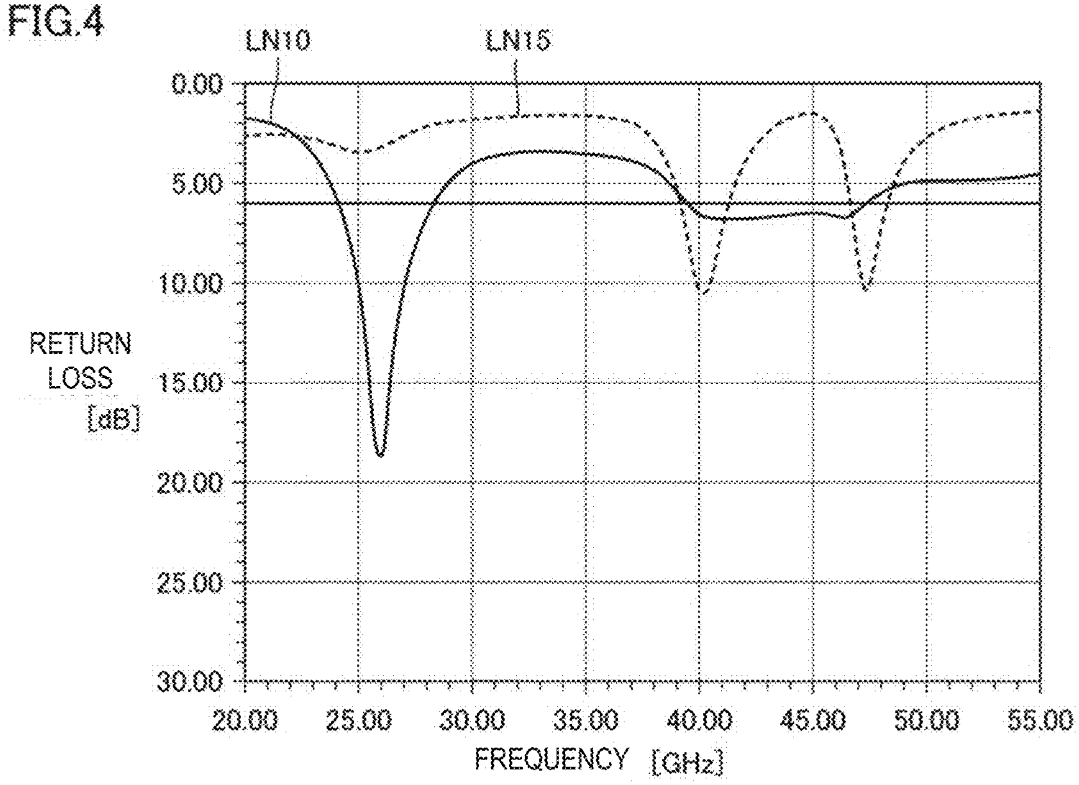
FIG. 4 is a view illustrating the antenna characteristics of the antenna module in FIG. 2.

FIG. 4 is a view illustrating the antenna characteristics of the antenna module 100 of Embodiment 1. In FIG. 4, the horizontal axis represents frequency, and the vertical axis represents return loss of each feed wiring line. In FIG. 4, a solid line LN10 represents the return loss of the feed wiring line 141, and a broken line LN15 represents the return loss of the feed wiring line 142.

As illustrated in FIG. 4, in the feed wiring line 141, the return loss is reduced near the 28 GHz band for the radiating element 121, and a frequency band leading to a return loss of 6.0 dB is from 24.2 to 28.4 GHz (band width: 4.2 GHz). In the feed wiring line 142, the return loss is reduced near the 39 GHz band for the radiating element 122 and near the 48 GHz band for the radiating element 123. A frequency band leading to the return loss of 6.0 dB in the 39 GHz band is from 39.1 to 41.3 GHz (band width: 2.2 GHz). A frequency band leading to the return loss of 6.0 dB in the 48 GHz band is from 46.7 to 48.2 GHz (band width: 1.5 GHz).

As described above, the antenna module 100 of Embodiment 1 has the configuration in which the radiating elements 122 and 123 share the output port of the RFIC 110 and the feed wiring line 142. As compared with a case where radio frequency signals are supplied from the RFIC 110 to the respective radiating elements 121, 122, and 123 by using separate feed wiring lines, the number of output ports of the RFIC 110 and the number of feed wiring lines disposed in the dielectric substrate 130 may thus be reduced. Accordingly, the apparatus size increase may be prevented, and the radio waves in three different frequency bands may also be radiated by using the three radiating elements.

The radiating element 121, the radiating element 122, and the radiating element 123 in Embodiment 1 respectively correspond to a first radiating element, a second radiating element, and a third radiating element in the present disclosure. The feed wiring line 141 and the feed wiring line 142 in Embodiment 1 respectively correspond to a first feed wiring line and a second feed wiring line in the present disclosure.

Modifications 1 and 2

For the antenna module 100 of Embodiment 1, the configuration in which power is independently supplied to the radiating element 121 by using the feed wiring line 141, and the radiating elements 122 and 123 share the feed wiring line 142 has heretofore been described.

In Modifications 1 and 2, antenna modules having different combinations of radiating elements that share a feed wiring line will be described. Specifically, in Modification 1, power is supplied to the radiating element 122 by a single feed wiring line, and the radiating elements 121 and 123 share a feed wiring line. In Modification 2, power is supplied to the radiating element 123 by a single feed wiring line, and the radiating elements 121 and 122 share a feed wiring line.

Figure 5:
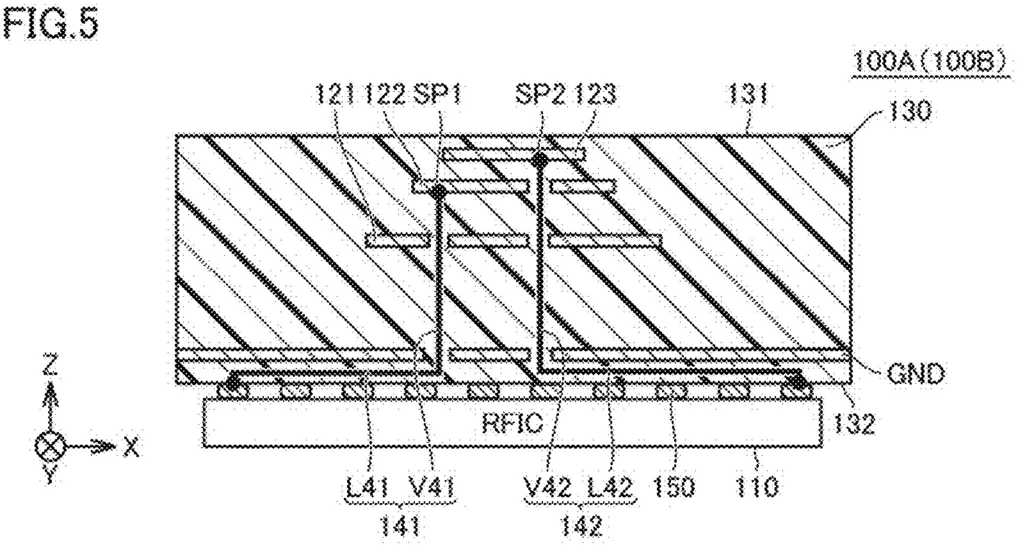
FIG. 5 is a side perspective view of an antenna module of Modification 1 and an antenna module of Modification 2.

FIG. 5 is a side perspective view of an antenna module 100A of Modification 1 and an antenna module 100B of Modification 2. The connection of the feed wiring lines is basically the same in each of Modification 1 and Modification 2.

The antenna modules 100A and 100B have the same configuration as that of the antenna module 100 of Embodiment 1 illustrated in FIG. 3 except a point that the feed wiring line 141 penetrates through the radiating element 121 and is connected to a feed point SP1 of the radiating element 122. In FIG. 5, description of components overlapping with those in FIG. 3 is not repeated.

In the case of the antenna module 100A of Modification 1, only a radio frequency signal for the radiating element 122 is supplied from the RFIC 110 via the feed wiring line 141. In contrast, for the feed wiring line 142, the radio frequency signal for the radiating element 121 or the radio frequency signal for the radiating element 123 is supplied from the RFIC 110 in a switching manner, and the radio frequency signal thereby is supplied to one of the radiating element 121 and the radiating element 123. The radiating element 121 is coupled to the feed wiring line 142 in the through hole through which the feed wiring line 142 penetrates.

In the case of the antenna module 100B of Modification 2, only a radio frequency signal for the radiating element 123 is supplied from the RFIC 110 via the feed wiring line 142. In contrast, for the feed wiring line 141, the radio frequency signal for the radiating element 121 or the radio frequency signal for the radiating element 122 is supplied from the RFIC 110 in a switching manner, and thereby the radio frequency signal is supplied to one of the radiating element 121 and the radiating element 122. The radiating element 121 is coupled to the feed wiring line 141 in the through hole through which the feed wiring line 141 penetrates.

As described above, sharing the feed wiring line by the radiating element 121 and the radiating element 123 or the radiating element 121 and the radiating element 122 enables the apparatus size increase to be prevented and also enables the radio waves in three different frequency bands to be radiated by using the three radiating elements.

In Modification 1, the feed wiring line 141 corresponds to the first feed wiring line in the present disclosure, and the feed wiring line 142 corresponds to the second feed wiring line in the present disclosure. In contrast, in Modification 2, the feed wiring line 142 corresponds to the first feed wiring line and the second feed wiring line in the present disclosure, and the feed wiring line 141 corresponds to the second feed wiring line in the present disclosure.

Embodiment 2

In Embodiment 2, a first example of a configuration in which a feed wiring line connected to the radiating element 123 has a different path will be described.

Figure 6:
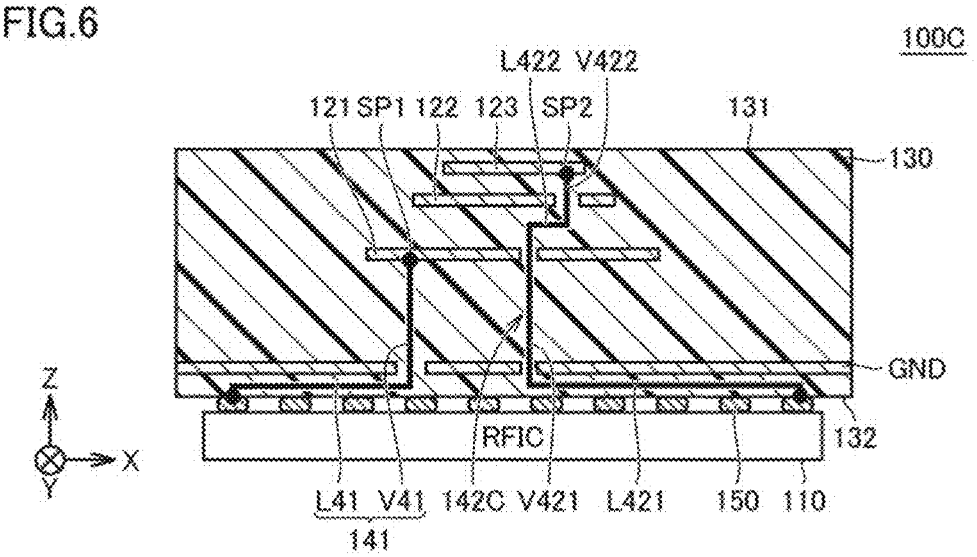
FIG. 6 is a side perspective view of an antenna module according to Embodiment 2.

FIG. 6 is a side perspective view of an antenna module 100C according to Embodiment 2. In the antenna module 100C, the feed wiring line 142 in the antenna module 100 of Embodiment 1 is replaced with a feed wiring line 142C, and this involves with different positions of the through holes in the radiating elements 121 and 122. In FIG. 6, description of components overlapping with those in the antenna module 100 of Embodiment 1 illustrated in FIG. 3 is not repeated.

With reference to FIG. 6, the feed wiring line 142C includes belt-shaped plate electrodes L421 and L422 and vias V421 and V422. From the RFIC 110 to a portion below and near the element center of the radiating element 121, the feed wiring line 142C extends as the plate electrode L421 in the negative direction of the X axis in the dielectric layer that is closer to the lower surface 132 than the ground electrode GND is. The feed wiring line 142C penetrates therefrom as the via V421 through the ground electrode GND and the radiating element 121 and extends to a dielectric layer between the radiating element 121 and the radiating element 122. To an end portion of the via V421 between the radiating element 121 and the radiating element 122, one end of a plate electrode L422 extending in the positive direction of the X axis is connected. The via V422 connects the other end of the plate electrode L422 and the feed point SP2 of the radiating element 123. In other words, the feed wiring line 142C penetrates through the radiating element 121 from a layer lower than the ground electrode GND, rises to a layer between the radiating element 121 and the radiating element 122, is shifted outward with respect to the element center, and thereafter further rises to the radiating element 123.

Typically, an electric field in a plate-shaped patch antenna becomes minimum at the center of an element and maximum at the end portion of the element in the polarization direction. As in the antenna module 100C, the through hole of the radiating element 121 not serving as a feed target using the feed wiring line 142C is formed at a position closer to the element center of the radiating element 121 than the through hole of the radiating element serving as a feed target is to the element center of the feed target radiating element, and thereby the coupling of the radiating element 121 to the feed wiring line 142C may be made weaker than that of coupling of the radiating elements 122 and 123 to the feed wiring line 142C. This enables improvement in isolation between the radio wave radiated from the radiating element 121 and the radio wave radiated from the radiating element 122 or 123.

Embodiment 3

In Embodiment 3, a second example of the configuration in which the feed wiring line connected to the radiating element 123 has a different path will be described.

Figure 7:
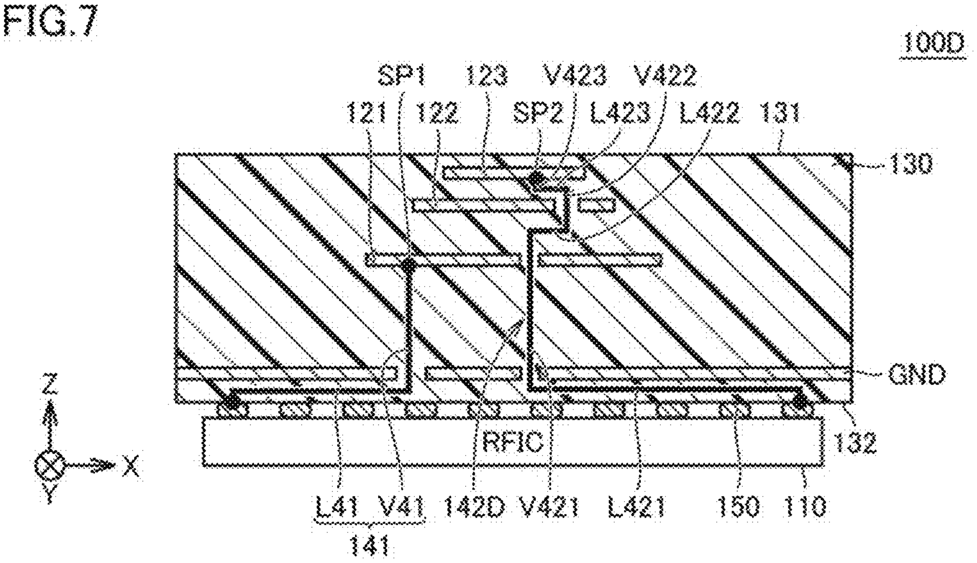
FIG. 7 is a side perspective view of an antenna module according to Embodiment 3.

FIG. 7 is a side perspective view of an antenna module 100D according to Embodiment 3. The antenna module 100D has a configuration in which the feed wiring line 142 of Embodiment 1 is replaced with a feed wiring line 142D. Schematically, the antenna module 100D further has a configuration in which in addition to the configuration of the antenna module 100C of Embodiment 2, the position of the through hole of the feed wiring line in the radiating element 122 and the position of the feed point SP2 of the radiating element 123 are shifted.

With reference to FIG. 7, the feed wiring line 142D includes the plate electrodes L421 and L422 and a plate electrode L423 of the belt shape, the vias V421 and V422, and a via V423. Like the feed wiring line 142C of Embodiment 2, the feed wiring line 142D penetrates as the via V421 through the radiating element 121 from the plate electrode L421 in a dielectric layer that is closer to the lower surface 132 than the ground electrode GND is, and rises to a dielectric layer between the radiating element 121 and the radiating element 122. The feed wiring line 142D then penetrates as the via V422 through the radiating element 122 at a position shifted outward with respect to the element center due to the plate electrode L421. The via V422 is connected to the plate electrode L423 in the dielectric layer between the radiating element 122 and the radiating element 123. The plate electrode L423 extends from a point of connection to the via V422 toward the element center of the radiating element 123 and is connected to the feed point SP2 of the radiating element 123 via the via V423.

Disposing the feed wiring line 142C in the path as described above enables the coupling of the radiating element 121 to the feed wiring line 142C to be weakened like Embodiment 2, and thus isolation between the radio wave radiated from the radiating element 121 and the radio wave radiated from the radiating element 122 or 123 may be improved.

Further, the position of the feed point SP2 of the radiating element 123 is made different from the position of the through hole of the radiating element 122 (that is, a feed point), and thereby matching between the feed wiring line 142D and each of the radiating elements 122 and 123 may be individually made appropriate. This enables the band widths of the radiating elements 122 and 123 to be increased and/or a return loss to be reduced, thus enabling contribution to antenna characteristic improvement.

Embodiment 4

In Embodiment 4, a configuration in which the degree of coupling of a feed wiring line to a radiating element is adjusted by changing the diameter of a through hole of a radiating element will be described.

Figure 8:
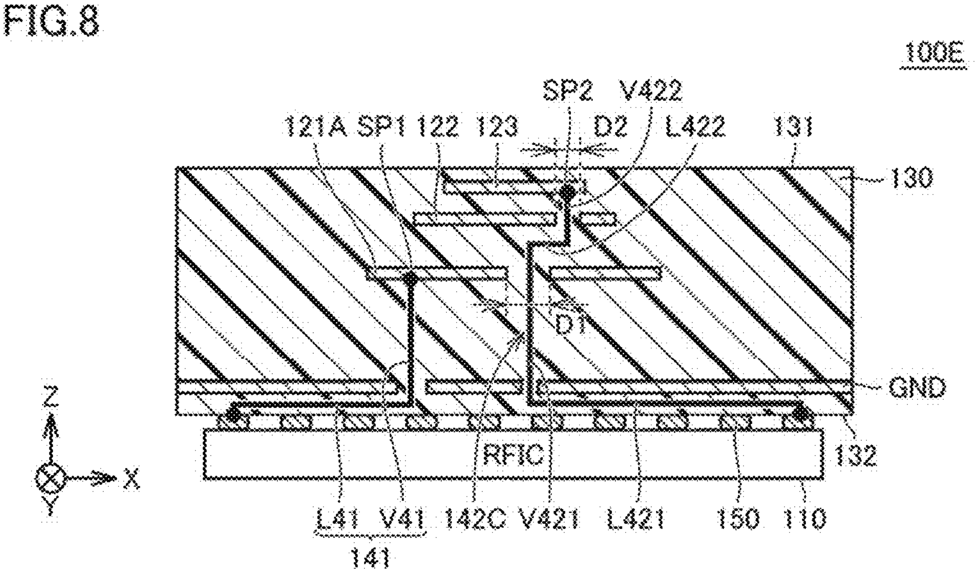
FIG. 8 is a side perspective view of an antenna module according to Embodiment 4.

FIG. 8 is a side perspective view of an antenna module 100E according to Embodiment 4. The antenna module 100E has a configuration different from that of the antenna module 100C of Embodiment 2 in a point that a diameter D1 of the through hole of the radiating element 121 is larger than a diameter D2 of the through hole of the radiating element 122 (D1>D2). The other components are the same as those of the antenna module 100C of Embodiment 2, and thus description of overlapping components is not repeated.

Since the feed wiring line 142C penetrates through the radiating element 121, supplying a radio frequency signal to the feed wiring line 142C causes coupling to at least the radiating element 121 due to electromagnetic coupling. In electromagnetic coupling caused by non-contact, the degree of coupling typically depends on a distance between two components, and a longer distance leads to weaker coupling. Since the radiating element 121 is not a feed target radiating element using the feed wiring line 142C, increasing the diameter of the through hole of the radiating element 121 and thus increasing the distance to the feed wiring line 142C enable coupling of the feed wiring line 142C to the radiating element 121 to be weakened. This enables further improvement in isolation between the radio wave radiated from the radiating element 121 and the radio wave radiated from the radiating element 122 or 123.

Embodiment 5

In Embodiment 5, a configuration in which the feature of the present disclosure is applied to a so-called dual polarization antenna module capable of radiating a radio wave from radiating elements in two different polarization directions will be described.

Figure 9:
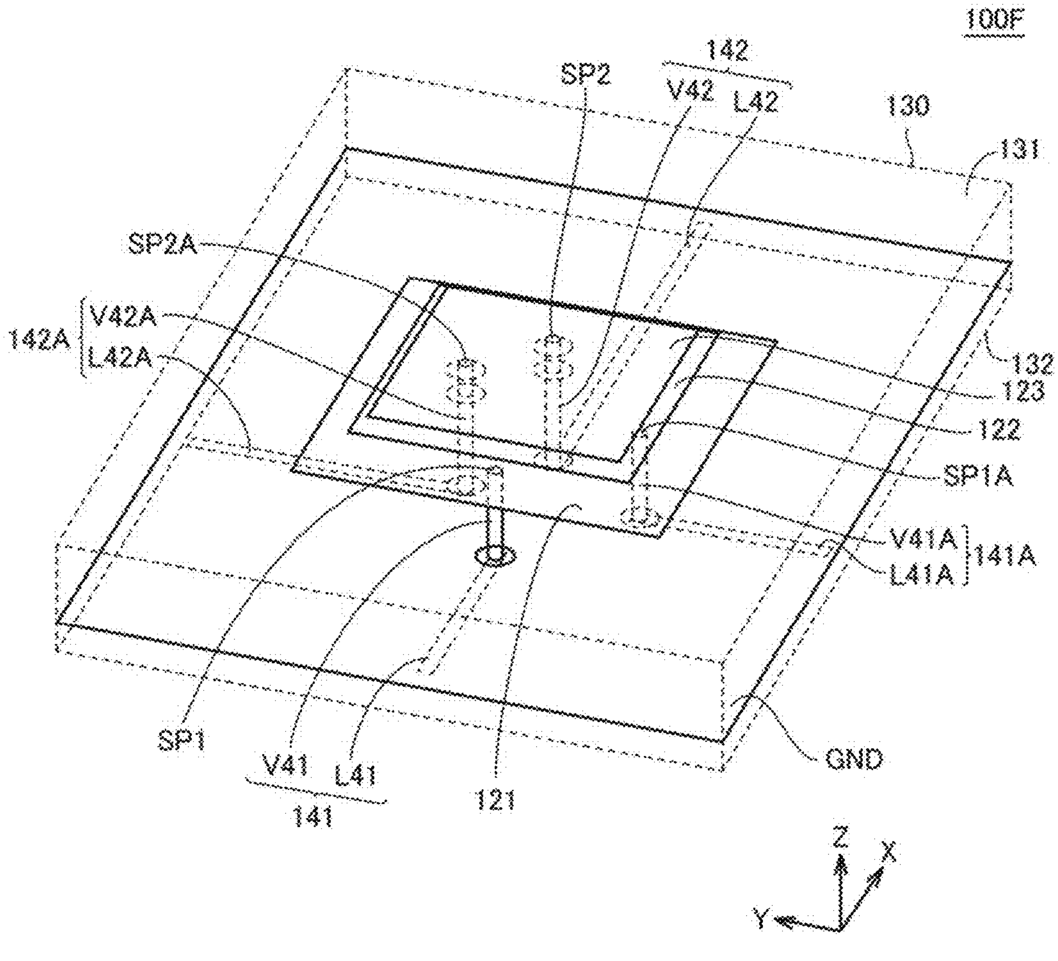
FIG. 9 is a perspective view of an antenna module according to Embodiment 5.

FIG. 9 is a perspective view of an antenna module 100F according to Embodiment 5. The antenna module 100F has a configuration in which feed wiring lines 141A and 142A are added to the configuration of the antenna module 100 of Embodiment 1 illustrated in FIG. 2. In FIG. 9, description of components overlapping with those in the antenna module 100 in FIG. 2 is not repeated.

The feed wiring line 141A includes a belt-shaped plate electrode L41A and a via V41A. From the RFIC 110 to a portion below the radiating element 121, the feed wiring line 141A extends as the plate electrode L41A in the positive direction of the Y axis in a dielectric layer that is closer to the lower surface 132 than is the ground electrode GND. The feed wiring line 141A penetrates therefrom as the via V41A through the ground electrode GND and is connected to a feed point SP1A of the radiating element 121. The feed point SP1A is shifted in the negative direction of the Y axis with respect to the element center of the radiating element 121. A radio frequency signal is supplied to the feed point SP1A, and thereby a radio wave a polarization direction of which is the Y-axis direction is radiated from the radiating element 121 in the Z-axis direction.

The feed wiring line 142A includes a belt-shaped plate electrode L42A and a via V42A. From the RFIC 110 to a portion below the radiating element 123, the feed wiring line 142A extends as the plate electrode L42A in the negative direction of the Y axis in a dielectric layer that is closer to the lower surface 132 than the ground electrode GND is. The feed wiring line 142A penetrates therefrom as the via V42A through the ground electrode GND and the radiating elements 121 and 122 and is connected to a feed point SP2A of the radiating element 123. The feed point SP2A is shifted in the positive direction of the Y axis with respect to the element center of the radiating element 123. A radio frequency signal for the radiating element 123 is supplied to the feed point SP2A, and thereby a radio wave the polarization direction of which is the Y-axis direction is radiated from the radiating element 123 in the Z-axis direction.

In addition, in response to a radio frequency signal for the radiating element 122 being supplied to the feed wiring line 142A, the feed wiring line 142A and the radiating element 122 are coupled together in a portion corresponding to the through hole of the radiating element 122. The through hole of the radiating element 122 is shifted in the positive direction of the Y axis with respect to the element center of the radiating element 123. Accordingly, in response to the radio frequency signal for the radiating element 122 being supplied, a radio wave a polarization direction of which is the Y-axis direction is radiated from the radiating element 122.

As described above, in the antenna module 100F, the radio frequency signals are supplied to the radiating elements at the two feed points at respective different positions. This enables radio waves with two different polarization directions to be radiated from the radiating elements.

Also in the antenna module 100F, sharing the output port of the RFIC 110 and the feed wiring lines 142 and 142A by the radiating element 122 and the radiating element 123 enables the apparatus size increase to be prevented and also enables the radio waves in three different frequency bands to be radiated by using the three radiating elements. In particular, in a dual polarization antenna module, the numbers of circuits and output ports in the RFIC 110 and feed wiring lines from the RFIC 110 to the radiating elements double the numbers of those in a single polarization antenna module such as the antenna module 100 of Embodiment 1. The size increase reduction effect exerted by sharing the output port and the feed wiring line by some components is thus more notable.

Embodiment 6

In Embodiment 6, a configuration in which the band widths of the frequency bands are increased by disposing matching elements on the feed wiring lines will be described.

Figure 10:
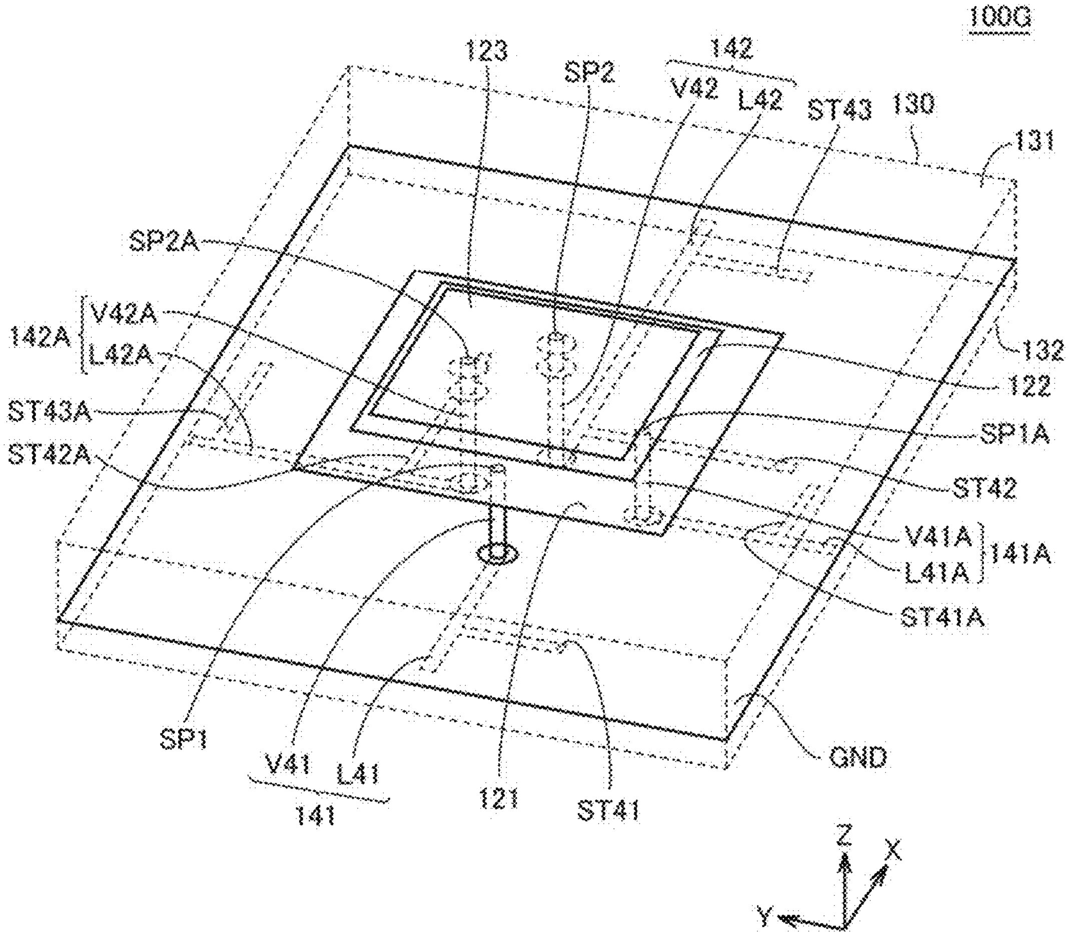
FIG. 10 is a perspective view of an antenna module according to Embodiment 6.

FIG. 10 is a perspective view of an antenna module 100G according to Embodiment 6. The antenna module 100G has a configuration in which stubs ST41, ST41A, ST42, ST42A, ST43, and ST43A that are matching elements are added to the configuration of the antenna module 100F of Embodiment 5 illustrated in FIG. 9. In FIG. 10, description of components overlapping with those in FIG. 9 is not repeated.

With reference to FIG. 10, the stubs ST41 and ST41A are stubs for the radiating element 121. The stub ST41 is a belt-shaped linear electrode extending in the Y-axis direction. The stub ST41 has one end connected to the plate electrode L41 in the feed wiring line 141 and the other end that is an open end. That is, the stub ST41 is an open stub extending in a direction orthogonal to the feed wiring line 141. An inductance value and/or a capacitance value is adjusted by changing the length and/or the width of the stub ST41, and thereby adjusting the impedance of the feed wiring line 141 enables impedance matching between the feed wiring line 141 and the radiating element 121. This enables improvement in the antenna characteristics of a radio wave radiated from the radiating element 121 the polarization direction of which is the X-axis direction.

The stub ST41A is a belt-shaped linear electrode extending in the X-axis direction. The stub ST41A has one end connected to the plate electrode L41A in the feed wiring line 141A and the other end that is an open end. That is, the stub ST41A is an open stub extending in a direction orthogonal to the feed wiring line 141A. Regarding the stub ST41A, adjusting the length and/or the width of the plate electrode enables impedance matching between the feed wiring line 141A and the radiating element 121. This enables improvement in the antenna characteristics of a radio wave radiated from the radiating element 121 the polarization direction of which is the Y-axis direction.

The stubs ST42 and ST42A are stubs for the radiating element 122. The stub ST42 is a belt-shaped linear electrode extending in the Y-axis direction. The stub ST42 has one end connected to the plate electrode L42 in the feed wiring line 142 and the other end that is an open end. That is, the stub ST42 is an open stub extending in a direction orthogonal to the feed wiring line 142. Regarding the stub ST42, adjusting the length and/or the width of the plate electrode enables impedance matching between the feed wiring line 142 and the radiating element 122. This enables improvement in the antenna characteristics of a radio wave radiated from the radiating element 122 the polarization direction of which is the X-axis direction.

The stub ST42A is a belt-shaped linear electrode extending in the X-axis direction. The stub ST42A has one end connected to the plate electrode L42A in the feed wiring line 142A and the other end that is an open end. That is, the stub ST42A is an open stub extending in a direction orthogonal to the feed wiring line 142A. Regarding the stub ST42A, adjusting the length and/or the width of the plate electrode enables impedance matching between the feed wiring line 142A and the radiating element 122. This enables improvement in the antenna characteristics of a radio wave radiated from the radiating element 122 the polarization direction of which is the Y-axis direction.

The stubs ST43 and ST43A are stubs for the radiating element 123. The stub ST43 is a belt-shaped linear electrode extending in the Y-axis direction. The stub ST43 has one end connected to the plate electrode L42 in the feed wiring line 142 and the other end that is an open end. That is, the stub ST43 is an open stub extending in the direction orthogonal to the feed wiring line 142. Regarding the stub ST43, adjusting the length and/or the width of the plate electrode enables impedance matching between the feed wiring line 142 and the radiating element 123. This enables improvement in the antenna characteristics of a radio wave radiated from the radiating element 123 the polarization direction of which is the X-axis direction.

The stub ST43A is a belt-shaped linear electrode extending in the X-axis direction. The stub ST43A has one end connected to the plate electrode L42A in the feed wiring line 142A and the other end that is an open end. That is, the stub ST43A is an open stub extending in the direction orthogonal to the feed wiring line 142A. Regarding the stub ST43A, adjusting the length and/or the width of the plate electrode enables impedance matching between the feed wiring line 142A and the radiating element 123. This enables improvement in the antenna characteristics of a radio wave radiated from the radiating element 123 the polarization direction of which is the Y-axis direction.

With reference to FIG. 10, the configuration in which the feed wiring lines 142 and 142A through which radio frequency signals are supplied to the radiating elements 122 and 123 are respectively provided with the stub conforming to the radiating element 122 and the stub conforming to the radiating element 123 has been described; however, as long as desired antenna characteristics are achieved, a configuration in which only one of the stub conforming to the radiating element 122 and the stub conforming to the radiating element 123 is disposed may be used. If the use of only the feed wiring lines enables appropriate impedance matching between the radiating elements and the feed wiring lines, the stubs do not have to be provided to the feed wiring lines.

With reference to the antenna module 100G in FIG. 10, the case where the stubs are the linear electrodes has been described; however, the stubs may be formed as electrodes bent midway.

(Antenna Characteristics)

Figure 11:
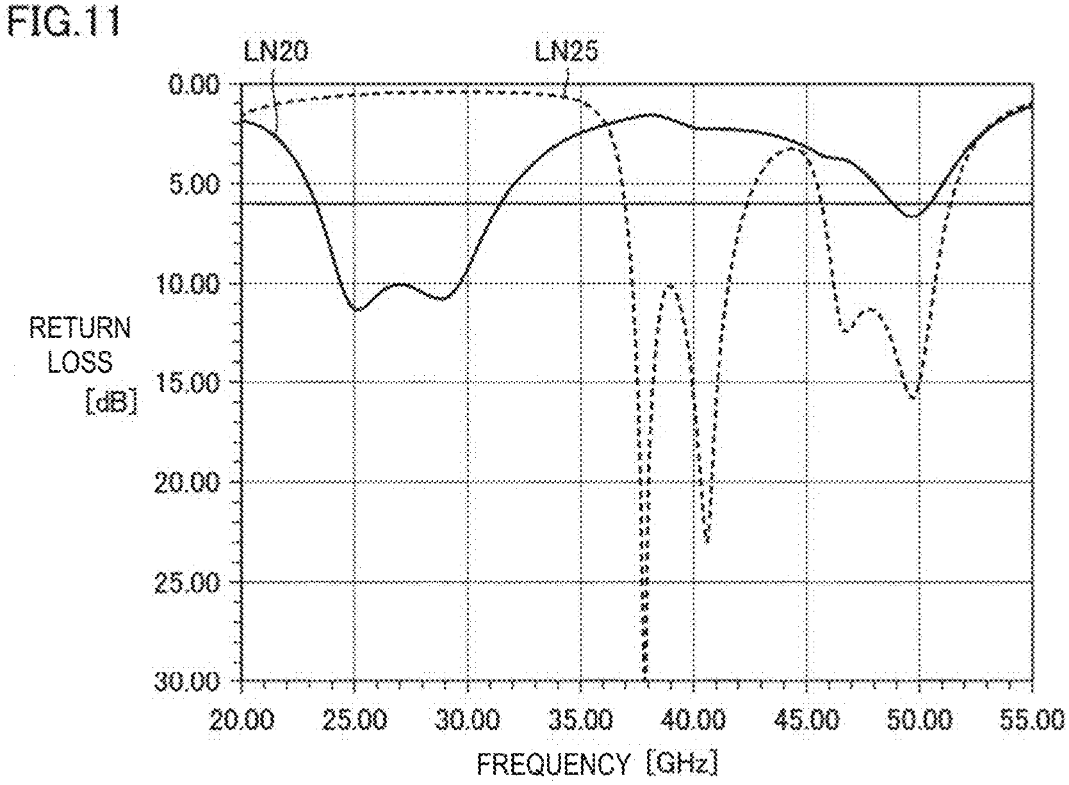
FIG. 11 is a view illustrating the antenna characteristics of the antenna module in FIG. 10.

FIG. 11 is a view illustrating the antenna characteristics of the antenna module 100G in FIG. 10. With reference to FIG. 11, the antenna characteristic of each radio wave the polarization direction of which is the X-axis direction in the radiating elements will be described as an example. In FIG. 11, the horizontal axis represents frequency, and the vertical axis represents return loss of each feed wiring line. In FIG. 11, a solid line LN20 represents the return loss of the feed wiring line 141, and a broken line LN25 represents the return loss of the feed wiring line 142.

As illustrated in FIG. 11, a frequency band leading to the return loss of 6.0 dB in the 28 GHz band is from 23.2 to 31.5 GHz (band width: 8.3 GHz). A frequency band leading to the return loss of 6.0 dB in the 39 GHz band is from 37.0 to 42.5 GHz (band width: 5.2 GHz). A frequency band leading to the return loss of 6.0 dB in the 48 GHz band is from 45.6 to 51.4 GHz (band width: 5.8 GHz). That is, performing impedance matching with the stubs disposed on the feed wiring lines results in band width increase in each of the frequency bands of 28, 39, and 48 GHz, as compared with the case of the configuration without stubs described with reference to FIG. 4.

As described above, performing the impedance matching between the radiating elements and the feed wiring lines with the radiating elements provided with the matching elements enables improvement in the antenna characteristic.

Modification 3

Figure 12:
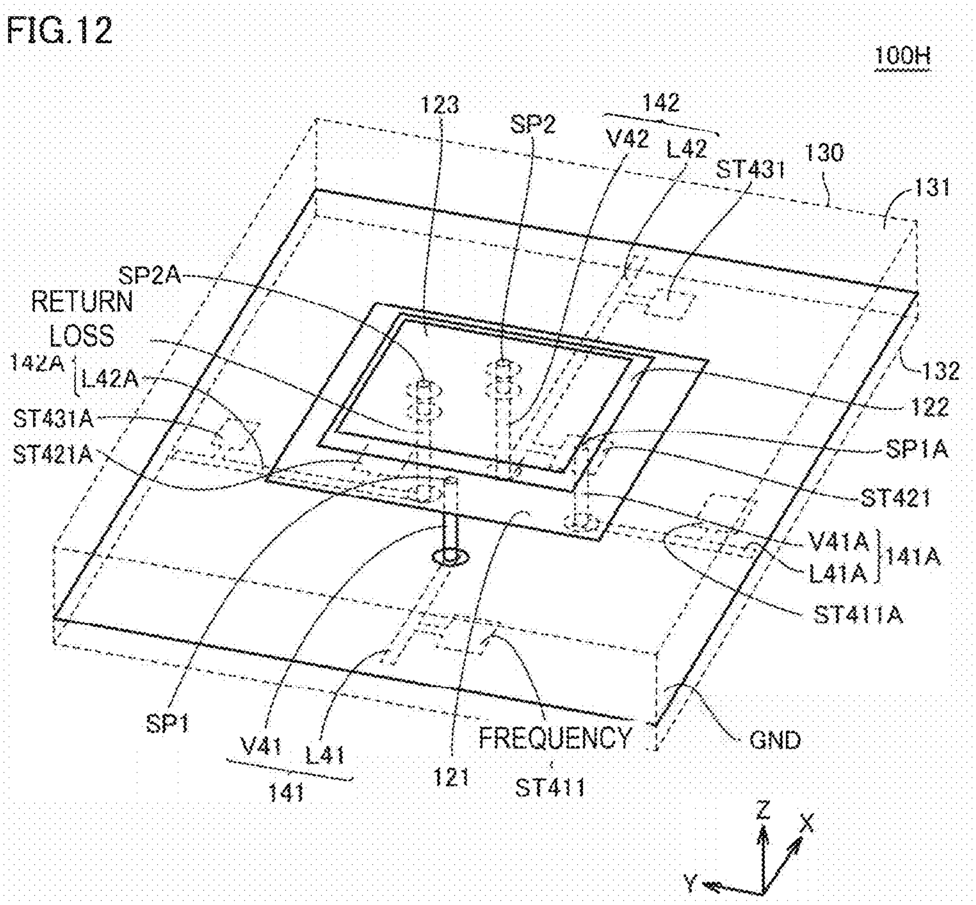
FIG. 12 is a perspective view of an antenna module of Modification 3.

In Modification 3, another example of the matching elements will be described. FIG. 12 is a perspective view of an antenna module 100H of Modification 3. The antenna module 100H has a configuration in which the stubs ST41, ST41A, ST42, ST42A, ST43, and ST43A in the antenna module 100G in FIG. 10 are respectively replaced with stubs ST411, ST411A, ST421, ST421A, ST431, and ST431A.

The stubs ST411, ST411A, ST421, ST421A, ST431, and ST431A are each composed of a linear electrode and a capacitive electrode. The linear electrode has a first end portion and a second end portion, and the first end portion is connected to the corresponding feed wiring line in such a manner as to be orthogonal to the feed wiring line. To the second end portion of the linear electrode, the capacitive electrode is connected. The capacitive electrode has a larger area than the linear electrode does, and the impedance of the feed wiring line is adjusted by using capacitance generated between the ground electrode GND and the capacitive electrode.

Also in the case of the capacitive matching elements as in Modification 3, impedance matching between the radiating element and the feed wiring line enables antenna characteristic improvement. In addition, the overall length of the element may be made shorter than each matching element of the linear electrode type in FIG. 10, which enables contribution to antenna module downsizing.

With reference to FIGS. 10 and 12, the example in which the stubs are disposed in the dual polarization antenna module has been described; however, the impedance matching using the stubs is applicable to the single polarization antenna module as in Embodiment 1.

Embodiment 7

In Embodiment 7, a configuration in which a feed wiring line through which a radio frequency signal is supplied to a radiating element for a low frequency band transmits the radio frequency signal to the radiating elements by using capacitive coupling will be described.

Figure 13:
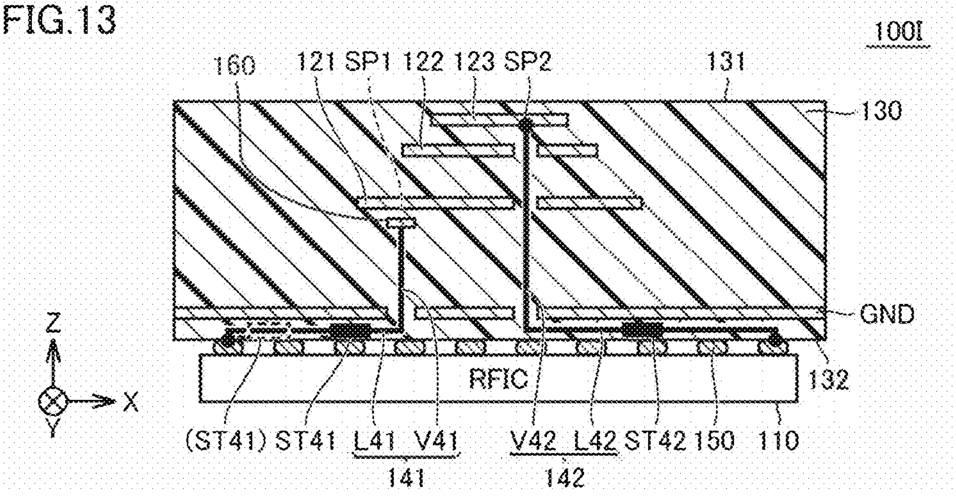
FIG. 13 is a side perspective view of an antenna module according to Embodiment 7.

FIG. 13 is a side perspective view of an antenna module 100I according to Embodiment 7. The antenna module 100I has a configuration in which a plate electrode 160 for power supply to the radiating element 121 and the stubs ST41 and ST42 described in Embodiment 6 (FIG. 10) are added to the configuration of the antenna module 100 of Embodiment 1. The stubs ST41 and ST42 are respectively disposed on the plate electrode L41 in the feed wiring line 141 and the plate electrode L42 in the feed wiring line 142. In FIG. 13, description of components overlapping with those in the antenna module 100 of Embodiment 1 is not repeated.

With reference to FIG. 13, the via V41 in the feed wiring line 141 has one end connected to the plate electrode L41 disposed in a layer lower than the ground electrode GND and the other end connected to the plate electrode 160. The plate electrode 160 is disposed spaced away from the radiating element 121 at a position near and below the feed point SP1 of the radiating element 121. That is, the via V41 is not directly connected to the radiating element 121 and is capacitively coupled to the radiating element 121 with the plate electrode 160 interposed therebetween. In the configuration as described above, the radio frequency signal may also be transmitted to the radiating element 121 by using the feed wiring line 141.

In addition, the plate electrode 160 may also function as the matching element because the plate electrode 160 causes a capacitance component to be added to the feed wiring line 141 and thus impedance to be changed. This influence enables the stub ST41 disposed on the feed wiring line 141 to be disposed along the feed wiring line 141 at a position closer to the radiating element 121 than a position (broken line) in a case where the via V41 is directly connected to the radiating element 121. This enables contribution to overall module downsizing.

(Antenna Characteristics)

In a case where a radio frequency signal is supplied by using capacitive coupling, it is possible that the antenna characteristics vary depending on the degree of capacitive coupling due to the plate electrode 160. Specifically, the higher the degree of the capacitive coupling, the easier the impedance matching between the feed wiring line and the radiating element. The loss is thus reduced in a wider frequency band, and the band width may be increased.

Figure 14:
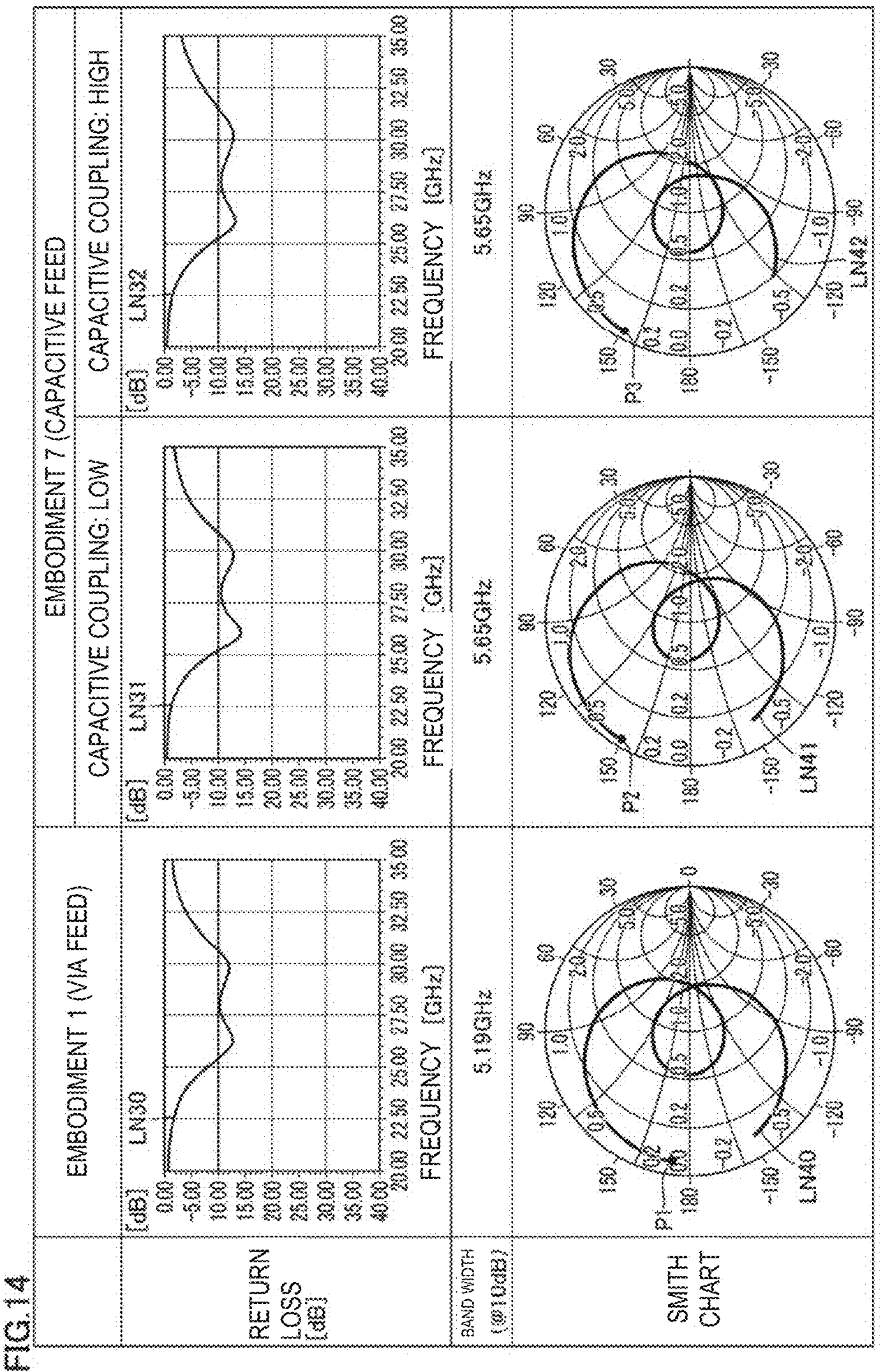
FIG. 14 is a view for explaining the antenna characteristics of the antenna module in FIG. 13.

FIG. 14 is a view for explaining the antenna characteristics of the antenna module 100I in FIG. 13. FIG. 14 illustrates return losses (upper row), band widths at 10 dB (middle row), and Smith charts (lower row) for cases of the via feed of Embodiment 1 (left column), relatively low capacitive coupling in the case of the capacitive feed of Embodiment 7 (middle column), and relatively high capacitive coupling (right column).

With reference to FIG. 14, in the case of the via feed of Embodiment 1, the frequency band leading to a return loss of 10 dB is from 25.41 to 30.6 GHz and has a band width of 5.19 GHz (a line LN30). In the case of the relatively low capacitive coupling, the frequency band leading to the return loss of 10 dB is from 25.21 to 30.86 GHz and has an increased band width of 5.65 GHz (a line LN31). In the case of the relatively high capacitive coupling, the frequency band leading to the return loss of 10 dB is from 25.18 to 31.54 GHz and has a further increased band width of 6.36 GHz (a line LN32).

With reference to the Smith charts, in the case of the capacitive feed (lines LN41 and LN42), the capacitance component of the plate electrode 160 causes start points P2 and P3 to be located in an upper part, that is, closer to capacitance than a start point P1 in the case of the via feed (a line LN40) is. The stubs cause adjustment to characteristic impedance of 50Q at the center frequency (28 GHz) to be performed; however, higher capacitive coupling leads to a longer length of a path to 50Q, and a shift variation is reduced. This causes the return loss in the wider frequency band to be reduced and thus enables the band width to be increased.

As described above, by using the capacitive coupling to supply the radio frequency signal to the radiating element independently supplied with power, the band width of the frequency band may be increased. For the antenna module 100I of Embodiment 7, an example of the configuration in which the radio frequency signal is supplied through the feed wiring line 141 by using the capacitive coupling has been described; however, regarding the feed wiring line 142, a radio frequency signal may also be supplied by using the capacitive coupling.

Aspects (First aspect) An antenna module according to an aspect includes: a dielectric substrate; a ground electrode disposed in the dielectric substrate; a first radiating element, a second radiating element, and a third radiating element that are of a plate shape; and a first feed wiring line and a second feed wiring line. The radiating elements are disposed in or on the dielectric substrate to face the ground electrode. The feed wiring lines transmit radio frequency signals to the radiating elements. The second radiating element is disposed between the third radiating element and the ground electrode. The first radiating element is disposed between the second radiating element and the ground electrode. The second radiating element is larger in size than the third radiating element, and the first radiating element is larger in size than the second radiating element. In plan view in a direction normal to the dielectric substrate, the radiating elements are disposed to overlap with each other. The first feed wiring line transmits a radio frequency signal to one of the first radiating element, the second radiating element, and the third radiating element. The second feed wiring line transmits a radio frequency signal to two remaining ones of the radiating elements.

(Second aspect) In the antenna module according to the first aspect, the first feed wiring line transmits a radio frequency signal to the first radiating element, and the second feed wiring line transmits a radio frequency signal to the second radiating element and the third radiating element.

(Third aspect) In the antenna module according to the second aspect, the second feed wiring line penetrates through the first radiating element and the second radiating element and is connected to the third radiating element. A through hole of the first radiating element is formed at a position closer to an element center of the first radiating element than a through hole of the second radiating element is to an element center of the second radiating element.

(Fourth aspect) In the antenna module according to the third aspect, a feed point of the third radiating element is disposed at a position closer to an element center of the third radiating element than the through hole of the second radiating element is to the element center of the second radiating element.

(Fifth aspect) In the antenna module according to any one of the second to fourth aspects, a size of the through hole of the first radiating element is larger than a size of the through hole of the second radiating element.

(Sixth aspect) In the antenna module according to any one of the second to fifth aspects, the first feed wiring line is connected to the first radiating element.

(Seventh aspect) In the antenna module according to any one of the second to fifth aspects, the first feed wiring line is capacitively coupled to the first radiating element.

(Eighth aspect) In the antenna module according to the first aspect, the first feed wiring line transmits a radio frequency signal to the second radiating element. The second feed wiring line transmits a radio frequency signal to the first radiating element and the third radiating element.

(Ninth aspect) In the antenna module according to the first aspect, the first feed wiring line transmits a radio frequency signal to the third radiating element. The second feed wiring line transmits a radio frequency signal to the first radiating element and the second radiating element.

(Tenth aspect) In the antenna module according to any one of the first to ninth aspects, each of the first radiating element, the second radiating element, and the third radiating element is capable of radiating a radio wave in two different polarization directions.

(Eleventh aspect) The antenna module according to any one of the first to tenth aspects further includes: a matching element connected to at least one of the first feed wiring line and the second feed wiring line.

(Twelfth aspect) In the antenna module according to the eleventh aspect, the matching element includes a linear electrode that is of a belt shape and that has a first end portion and a second end portion. The linear electrode is connected to a corresponding one of the feed wiring lines at the first end portion and extends in a direction orthogonal to the feed wiring line.

(Thirteenth aspect) In the antenna module according to the twelfth aspect, the matching element further includes a capacitive electrode connected to the second end portion.

(Fourteenth aspect) In the antenna module according to any one of the first to thirteenth aspects, a first distance between the first radiating element and the ground electrode is longer than a second distance between the first radiating element and the second radiating element. The second distance is longer than a third distance between the second radiating element and the third radiating element.

(Fifteenth aspect) An antenna module according to another aspect includes: a dielectric substrate; a ground electrode disposed in the dielectric substrate; a first radiating element to a third radiating element that are of a plate shape; and a first feed wiring line and a second feed wiring line. The radiating elements are disposed in or on the dielectric substrate to face the ground electrode. The feed wiring lines transmit radio frequency signals to the radiating elements. The second radiating element is disposed between the third radiating element and the ground electrode. The first radiating element is disposed between the second radiating element and the ground electrode. The first radiating element is capable of radiating a radio wave in a first frequency band. The second radiating element is capable of radiating a radio wave in a second frequency band higher than the first frequency band. The third radiating element is capable of radiating a radio wave in a third frequency band higher than the second frequency band. In plan view in a direction normal to the dielectric substrate, the radiating elements are disposed to overlap with each other. The first feed wiring line transmits a radio frequency signal to one of the first radiating element, the second radiating element, and the third radiating element. The second feed wiring line transmits a radio frequency signal to two remaining ones of the radiating elements.

(Sixteenth aspect) In the antenna module according to the fifteenth aspect, the first frequency band is a 28 GHz band, the second frequency band is a 39 GHz band, and the third frequency band is a 48 GHz band.

(Seventeenth aspect) The antenna module according to any one of the first to sixteenth aspects further includes a feeder circuit that supplies a radio frequency signal to each of the radiating elements by using the first feed wiring line and the second feed wiring line.

(Eighteenth aspect) A communication apparatus includes the antenna module according to any one of the first to seventeenth aspects.

The embodiments disclosed this time are to be construed as being illustrative and not restrictive in all respects. It is intended that the scope of the present invention be defined by the scope of claims, not by the description of the embodiments above, and include the meaning equivalent to the scope of claims and any change made within the scope.

REFERENCE SIGNS LIST

10 communication apparatus
100, 100A to 100I antenna module
110 RFIC
111A to 111H, 113A to 113H, 117A, 117B switch
112AR to 112HR low-noise amplifier
112AT to 112HT power amplifier
114A to 114H attenuator
115A to 115H phase shifter
116A, 116B signal multiplexer/demultiplexer
118A, 118B mixer
119A, 119B amplifier circuit
120 antenna device
121 to 123 radiating element
125 antenna element
130 dielectric substrate
131 upper surface
132 lower surface
141, 141A, 142, 142A, 142C, 142D feed wiring line
150 solder bump
160, L41, L41A, L42, L42A, L421 to L423 plate electrode
V41, V41A, V42, V42A, V421 to V423 via
200 BBIC
GND ground electrode
SP1 to SP3, SP1A, SP2A feed point
ST41, ST411, ST41A, ST411A, ST42, ST421, ST42A, ST421A, ST43, ST431, ST43A, ST431A stub.

The invention claimed is:

1. An antenna module comprising:
a dielectric substrate;
a ground electrode disposed in the dielectric substrate;
a first radiating element, a second radiating element, and a third radiating element that are each of a plate shape and that are each disposed in or on the dielectric substrate to face the ground electrode; and
a first feed wiring line and a second feed wiring line that are respectively positioned to convey radio frequency signals to at least one of the first radiating element, the second radiating element, and the third radiating element, wherein
the second radiating element is disposed between the third radiating element and the ground electrode,
the first radiating element is disposed between the second radiating element and the ground electrode,
the second radiating element is larger in size than the third radiating element,
the first radiating element is larger in size than the second radiating element,
in plan view in a direction normal to the dielectric substrate, the first radiating element, the second radiating element, and the third radiating element are disposed to overlap with each other, the first feed wiring line is positioned to convey radio frequency signals to one of the first radiating element, the second radiating element, and the third radiating element, and the second feed wiring line is positioned to convey radio frequency signals to two remaining ones of the radiating elements.

2. The antenna module according to claim 1, wherein the first feed wiring line is positioned to convey radio frequency signals to the first radiating element, and the second feed wiring line is positioned to convey radio frequency signals to the second radiating element and the third radiating element.

3. The antenna module according to claim 2, wherein the second feed wiring line penetrates through the first radiating element and the second radiating element and is connected to the third radiating element, and the first radiating element includes a through hole positioned closer to an element center of the first radiating element than a through hole of the second radiating element positioned relative to an element center of the second radiating element.

4. The antenna module according to claim 3, wherein a feed point of the third radiating element is positioned closer to an element center of the third radiating element than the through hole of the second radiating element positioned relative to the element center of the second radiating element.

5. The antenna module according to claim 3, wherein a size of the through hole of the first radiating element is larger than that of the through hole of the second radiating element.

6. The antenna module according to claim 2, wherein the first feed wiring line is connected to the first radiating element.

7. The antenna module according to claim 2, wherein the first feed wiring line is capacitively coupled to the first radiating element.

8. The antenna module according to claim 1, wherein the first feed wiring line is positioned to convey radio frequency signals to the second radiating element, and the second feed wiring line is positioned to convey radio frequency signals to the first radiating element and the third radiating element.

9. The antenna module according to claim 1, wherein the first feed wiring line is positioned to convey radio frequency signals to the third radiating element, and the second feed wiring line is positioned to convey radio frequency signals to the first radiating element and the second radiating element.

10. The antenna module according to claim 1, wherein each of the first radiating element, the second radiating element, and the third radiating element is capable of radiating a radio wave in two different polarization directions.

11. The antenna module according to claim 1, further comprising:

a matching element connected to at least one of the first feed wiring line and the second feed wiring line.

12. The antenna module according to claim 11, wherein the matching element includes a linear electrode having a belt shape with a first end portion and a second end portion, and the linear electrode is connected to a corresponding one of the first feed wiring line and the second feed wiring line the first end portion and extends in a direction orthogonal to the feed wiring line.

13. The antenna module according to claim 12, wherein the matching element further includes a capacitive electrode connected to the second end portion.

14. The antenna module according to claim 1, wherein a first distance between the first radiating element and the ground electrode is longer than a second distance between the first radiating element and the second radiating element, and the second distance is longer than a third distance between the second radiating element and the third radiating element.

15. An antenna module comprising:

a dielectric substrate;

a ground electrode disposed in the dielectric substrate;

a first radiating element, a second radiating element, and a third radiating element that are each of a plate shape and that are each disposed in or on the dielectric substrate to face the ground electrode; and a first feed wiring line and a second feed wiring line that are each positioned to convey a radio frequency signal from a feeder circuit, wherein the second radiating element is disposed between the third radiating element and the ground electrode, the first radiating element is disposed between the second radiating element and the ground electrode, the first radiating element is capable of radiating a radio wave in a first frequency band, the second radiating element is capable of radiating a radio wave in a second frequency band that is higher in frequency than the first frequency band, the third radiating element is capable of radiating a radio wave in a third frequency band that is higher in frequency than the second frequency band, as viewed from plan view in a direction normal to the dielectric substrate, the first radiating element, the second radiating element, and the third radiating element are disposed to overlap with each other, the first feed wiring line is positioned to convey radio frequency signals to one of the first radiating element, the second radiating element, and the third radiating element, and the second feed wiring line is positioned to convey radio frequency signals to two remaining ones of the radiating elements.

16. The antenna module according to claim 15, wherein the first frequency band is a 28 GHz band, wherein the second frequency band is a 39 GHz band, and wherein the third frequency band is a 48 GHz band.

17. The antenna module according to claim 1, further comprising:

a feeder circuit that supplies a radio frequency signal to each of the first radiating element, the second radiating element, and the third radiating element via the first feed wiring line and the second feed wiring line.

18. The antenna module according to claim 2, further comprising:

a feeder circuit that supplies a radio frequency signal to each of the first radiating element, the second radiating element, and the third radiating element via the first feed wiring line and the second feed wiring line.

19. A communication apparatus including the antenna module according to claim 1.

20. A communication apparatus including the antenna module according to claim 15.

* * * * *